United States Patent Office 2,940,816
Patented June 14, 1960

2,940,816

FABRIC SOFTENER CONTAINING UREA INCLUSION COMPOUND OF HYDROGENATED TALLOW QUATERNARY AMMONIUM SALT

Mitchell S. Sniegowski, Chicago, Ill., assignor to Corn Products Company, a corporation of Delaware No Drawing. Filed Nov. 25, 1957, Ser. No. 698,345

3 Claims. (Cl. 8—76)

This invention relates to a new and useful textile softener in the form of a dry, free-flowing powder which is readily dispersible in cold water.

The utility of textile softeners is well known. When these products are dispersed in the final rinse water during the washing process, the clothes rinsed therein have improved softness or hand, will not accumulate static electrical charges and are ironed more easily. Many liquid fabric softeners are now being marketed which may be added to the final rinse water. Liquid products, however, have certain inherent disadvantages. The dispersions tend to separate on standing, sometimes the dye will settle to the bottom of the bottle. On exposure to low temperatures the contents will freeze and break the bottle. Furthermore, after freezing and thawing, the product becomes difficult to disperse in water. An important economic disadvantage of liquid softeners is the relatively high cost of packaging and shipping.

It is an object of this invention to prepare a new and useful textile softener in dry, free-flowing form which is readily dispersible in cold water. A further object is to provide products in dry form which will impart softness and increased fluffiness to textiles treated therewith and increase ease of ironing. Still a further object is to provide a dry product readily dispersible in water which will reduce the tendency of fabrics to take on a charge of static electricity. Other objects will appear hereinafter.

I have discovered a method for making a new and useful cold water dispersible dry textile softener composition, the active ingredient of which is technical distearylmethyltriethyoxyethanol ammonium methosulfate to be described more fully hereinafter. This product may be used in the same manner as the liquid products, and, in addition to imparting improvements to the fabric treated, has the advantage over liquid products of being unaffected by low temperatures. The product remains unchanged on prolonged storage. And, most important, the product may be packaged in a relatively inexpensive container.

My novel product consists of a urea inclusion compound made from the aforementioned softener and urea. A non-ionic wetting agent is usually added to make the product dispersible in cold water. By urea inclusion compound, I mean the type described at pages 244-251 of Progress in Chemistry of Fats and Other Lipids, vol. II, published by Academic Press (1954). Adjuncts may be added to the formulation; salts to dilute the material, an agent to make the product more free-flowing, dye to improve the color, perfume to make the product more appealing and a whitening agent to overcome any tendency of the product to yellow the fabric.

In making my new product, the active ingredient is dissolved in a solvent, such as ethyl alcohol, isopropyl alcohol, and the like, and then mixed with the other ingredients in any order and the mixture heated at a temperature not exceeding about 80° C. Thereafter, the product is ground and packed.

A specific procedure which has been found satisfactory is to mix the active ingredient dissolved in sufficient alcohol to make a 75 percent dry substance paste with the dye, whitener, and diluent, if desired. Elevated temperatures may be used but mixing at room temperature is satisfactory. The resultant mixture is pumped onto an agitated bed of urea and the mass is heated at 80° C. for an hour. In a pilot plant run, a steam-jacketed Simpson Intensive mixer was found to be satisfactory. In the laboratory, the aforementioned mixture was added to urea while the latter was vigorously agitated in a Waring Blendor. After the urea is well mixed with the other ingredients, the pasty mass may be dried in an oven at 80° C. for about an hour. An alternate procedure used successfully is to dry the pasty mass overnight at room temperature.

After being dried, the product is ground, mixed with the perfume and flow-promoting agent and, if desired, reground.

A satisfactory product may be made also by emulsifying the various ingredients in a minimum amount of water and spray-drying the emulsion.

The softening agent referred to has the formula

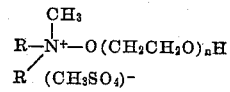

wherein $n$ equols an average of 4 and R is a hydrogenated tallow or technical stearyl group. It is made by reacting hydrogenated tallow with ammonia to produce the nitrile and treating it under reducing conditions to produce

This is reacted with sufficient ethylene oxide to form R—N—O(CH$_2$CH$_2$O)$_n$H with $n$ averaging 4. The latter is reacted with (CH$_3$)$_2$SO$_4$ to form the quaternary ammonium salt.

The amount of softening agent may vary from about 5 to about 20 percent of the total dry product. The amount of urea should be at least about 3.5 times or preferably more the amount of the softening agent, and the wetting agent should be about 5 to 30 percent of the softening agent. If diluents are used to reduce the cost of the formulation, they may be used in amounts up to one-half to three-fourths of the weight of the dry product depending upon the concentration of the active ingredient. The other additives, e.g., perfume, whitening agent, dye, may be used in small amounts, generally, in amounts less than 3 percent of the total product.

As diluents, sodium chloride or borax are satisfactory. Excess urea may also be used as a diluent. Various water-soluble, non-ionic surface active agents may be used and among those satisfactory is a non-ionic surfactant made by reacting ethylene oxide with an alkylated phenol, sold under the name Igepal CO-630 by The General Dyestuff Company. This surfactant when dissolved in distilled water at a concentration of about 0.01 percent has a surface tension of 30 dynes per centimeter. Other surfactants with similar surface tension values may be used also. The amount of surfactant should be about 15 percent of the softener in the formulation.

Some of the powders prepared from the active ingredient and urea do not flow readily, i.e., they have some tendency to stick. I have found that the addition of 1 to 3 percent (of the total product) of an adjunct such as a synthetic calcium silicate or a silica gel improves the flowability of the powder remarkably, although the use of such an agent is optional.

Whitening agents are not obligatory but are preferable to the present invention. The whitening agent should not react with the active ingredient. A satisfactory whitening agent is a substituted coumarin derivative sold under the name of Calcofluor White SD by American Cyanamid Company. Another whitening agent which may be used is a stilbene type of fluorescent brightener sold under the name Blancophor HS–76 by Antara Chemicals, a division of General Aniline and Film Corporation. Concentration from 0.005 percent to 0.025 percent, based on the total product, have been found useful.

In Table I below are listed various formulations within the scope of the present invention and their dispersibilities and flowabilities are also indicated. In each case, except (d), the formulation was prepared by the laboratory method previously described.

Table I

| Formulation | | | | | Temperature, °C. | Dispersibility ᵃ | Flowability ᵇ |
| --- | --- | --- | --- | --- | --- | --- | --- |
| Softener (percent d.b.) | Surfactant (Igepal CO-630) (percent) | Urea (percent) | Borax (percent) | NaCl (percent) | | | |
| 20 ᶜ | 3.0 | 77.0 | | | 80 | Good | Good |
| 10 ᶜ | 1.5 | 88.5 | | | 80 | Good | Fair |
| 10 | 1.5 | 88.5 | | | rm. temp. | Good | Fair |
| 10 | | 90.0 | | | 80 | Poor | Fair |
| 10 | | 38.5 | 50 | | 80 | Fair | Fair |
| 10 | 1.5 | 38.5 | | 50 | 80 | Fair | Fair |
| 10 ᵈ | 1.5 | 19.25 | 75 | | 80 | Fair | Fair |
| 5 ᶜᵉ | 0.75 | | | | 80 | Good | Good |
| 20 ᵉ | | 77.0 | | | | | |

ᵃ Rated for rapidity and completeness of dispersion in 50° F. water.
ᵇ Judged visually.
ᶜ 0.005 Percent Calcofluor SD added prior to drying.
ᵈ This composition was emulsified in water and dried under simulated spray-drying conditions.
ᵉ When the whitening agent is omitted, the fabric rinsed with the softening formulation exhibits a very slightly perceptible yellow coloring after drying.

I claim:
1. As a new composition of matter a dry, free-flowing fabric softener in powdered form, dispersible in cold water, comprising a urea inclusion compound of a softening agent having the formula

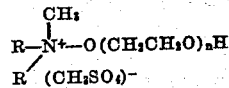

wherein $n$ equals an average of 4 and R is a hydrogenated tallow group; and a non-ionic wetting agent; the amount of softening agent being present in from about 5 to about 20 percent of the total dry product, the amount of urea being at least 3.5 times the weight of the softening agent and the amount of wetting agent being about 5 to 30 percent of the softening agent.

2. The composition according to claim 1 including a dye, whitener, and an agent to improve the flowability of the powder in total amount not exceeding about 3 percent of the total product.

3. A composition according to claim 1 in which the amount of urea is equal to about 3.5 times the amount of softening agent, and a water-soluble diluent, dye, whitener, and an agent to improve the flowability of the powder make up the remainder of the formulation, the total amount of the last three additives not exceeding about 3 percent of the total product.

References Cited in the file of this patent

UNITED STATES PATENTS

| | | |
| --- | --- | --- |
| 2,290,503 | Stuewer | July 21, 1942 |
| 2,516,267 | Sitzler et al. | July 25, 1950 |
| 2,695,291 | Niederl et al. | Nov. 23, 1954 |
| 2,830,039 | Weitkamp et al. | Apr. 8, 1958 |

OTHER REFERENCES

Schwartz et al.: "Surface Active Agents," Intersci. Pub., N.Y., pp. 435–437, vol. I, 1949.